United States Patent
An et al.

(10) Patent No.: US 10,401,992 B2
(45) Date of Patent: *Sep. 3, 2019

(54) SUBSTRATE FOR DISPLAY DEVICE

(71) Applicant: Corning Precision Materials Co., Ltd., Chungcheongnam-do (KR)

(72) Inventors: Jin Soo An, Chungcheongnam-do (KR); Min Seok Kim, Chungcheongnam-do (KR)

(73) Assignee: Corning Precision Materials Co., Ltd. (KR)

( * ) Notice: Subject to any disclaimer, the term of this patent is extended or adjusted under 35 U.S.C. 154(b) by 139 days.

This patent is subject to a terminal disclaimer.

(21) Appl. No.: 15/508,724

(22) PCT Filed: Sep. 3, 2015

(86) PCT No.: PCT/KR2015/009276
§ 371 (c)(1),
(2) Date: Mar. 3, 2017

(87) PCT Pub. No.: WO2016/036152
PCT Pub. Date: Mar. 10, 2016

(65) Prior Publication Data
US 2017/0255290 A1    Sep. 7, 2017

(30) Foreign Application Priority Data
Sep. 5, 2014 (KR) .................. 10-2014-0118895

(51) Int. Cl.
*G06F 3/041*   (2006.01)
*B32B 7/023*   (2019.01)
(Continued)

(52) U.S. Cl.
CPC ............... *G06F 3/041* (2013.01); *B32B 7/02* (2013.01); *B32B 7/023* (2019.01); *G02B 1/113* (2013.01); *G02B 5/286* (2013.01)

(58) Field of Classification Search
CPC ............... G02B 1/11–1/18; B32B 7/02; C03C 2217/734; C03C 17/00–17/44
See application file for complete search history.

(56) References Cited

U.S. PATENT DOCUMENTS 3,235,397 A * 2/1966 Millendorfer ......... G02B 1/115
                                                   359/588
5,332,618 A * 7/1994 Austin .................. G02B 1/115
                                                   359/359
(Continued)

FOREIGN PATENT DOCUMENTS

JP    2003236970 A    8/2003
JP    2007527328 A    9/2007
(Continued)

OTHER PUBLICATIONS

International Search Report for Application No. PCT/KR2015/009276 dated Dec. 23, 2015.

*Primary Examiner* — Prashant J Khatri
(74) *Attorney, Agent, or Firm* — Lerner, David, Littenberg, Krumholz & Mentlik, LLP

(57) ABSTRACT

The present invention relates to a substrate for a display device and, more particularly, to a substrate for a display device, which not only has excellent durability, but can also minimize the occurrence of color shift when applied to a display device. To this end, the present invention provides a substrate for a display device, which is characterized by including: a substrate; a hard coat film formed on the substrate and formed of AlON; and a multilayer film formed between the substrate and the hard coat film, and formed of a coating film having a first refractive index and a coating film having a second refractive index, which are repetitively stacked in sequence.

6 Claims, 3 Drawing Sheets

(51) Int. Cl.
    *B32B 7/02*     (2019.01)
    *G02B 1/113*     (2015.01)
    *G02B 5/28*     (2006.01)

(56) References Cited

U.S. PATENT DOCUMENTS

| | | | |
|---|---|---|---|
| 7,736,728 B2 * | 6/2010 | Loboda | H01L 21/02126 |
| | | | 428/216 |
| 7,910,215 B2 | 3/2011 | Reymond et al. | |
| 2006/0240266 A1 | 10/2006 | Schicht et al. | |
| 2006/0269733 A1 | 11/2006 | Mizuno et al. | |
| 2013/0176615 A1 * | 7/2013 | Uefuji | G02B 1/113 |
| | | | 359/359 |

FOREIGN PATENT DOCUMENTS

| | | | |
|---|---|---|---|
| JP | 2007279203 A | 10/2007 | |
| JP | 2009529715 A | 8/2009 | |
| KR | 20060128828 A | 12/2006 | |
| KR | 20110135612 A | 12/2011 | |

\* cited by examiner

SUBSTRATE FOR DISPLAY DEVICE

CROSS-REFERENCE TO RELATED APPLICATION

This application is a national phase entry under 35 U.S.C. § 371 of International Application No. PCT/KR2015/009276, filed Sep. 3, 2015, published in Korean, which claims priority to Korean Patent Application No. 10-2014-0118895, filed on Sep. 5, 2014, the disclosures of which are incorporated herein by reference.

BACKGROUND OF THE INVENTION

Field of the Invention

The present invention relates to a substrate for a display device, and more particularly, to a substrate for a display device having superior durability and able to minimize color shift when applied to a display device.

Description of Related Art

In response to the emergence of the information society, image display components and devices have been significantly improved and have become widespread. Among such components and devices, image display devices are widespread for use in TVs, personal computer (PC) monitors, and the like. Accordingly, cathode ray tubes (CRTs) representative of traditional display devices are being rapidly substituted with flat panel displays (FPDs) such as liquid crystal displays (LCDs), plasma display panels (PDPs), field emission displays (FEDs) and organic light-emitting displays (OLEDs).

Recently, in response to the introduction of smartphones, the use of touchscreen panels, mainly on mobile display devices, is rapidly increasing. A touchscreen panel is a device which is disposed on the front of a display device. Such a touchscreen panel is designed to output a signal when a user touches the touchscreen panel with a finger or an input device such as a stylus, while viewing the touchscreen panel. In such a touchscreen panel, high mechanical durability is required for the cover substrate considering functions thereof, since it must withstand millions of touches while satisfying the requirement of high light transmittance. Therefore, continuous attempts to fabricate a cover substrate able to realize better durability and optical characteristics have been made.

RELATED ART DOCUMENT

Patent Document 1: Korean Patent Application Publication No. 10-2011-0135612 (Dec. 19, 2011)

BRIEF SUMMARY OF THE INVENTION

Various aspects of the present invention provide a substrate for a display device having superior durability and able to minimize color shift when applied to a display device.

In an aspect of the present invention, provided is a substrate for a display device that includes: a base substrate; a hard coat film disposed over the base substrate, the hard coat film being formed of AlON; and a multilayer film disposed between the base substrate and the hard coat film, wherein the multilayer film includes coating films having a first refractive index and coating films having a second refractive index which are sequentially and repeatedly stacked on each other According to an exemplary embodiment, the coating films having the first refractive index and the coating films having the second refractive index may be sequentially and repeatedly stacked on each other at least two times.

The first refractive index may range from 2.0 to 2.5, and the second refractive index ranges from 1.35 to 1.6.

The multilayer film may include: a first coating film disposed on the base substrate, the first coating film having the first refractive index; a second coating film disposed on the first coating film, the second coating film having the second refractive index; a third coating film disposed on the second coating film, the third coating film having the first refractive index; and a fourth coating film disposed on the third coating film, the fourth coating film having the second refractive index.

The first and third coating films may be formed of a metal oxide, the refractive index of which ranges from 2.0 to 2.5, the metal oxide being selected from the group consisting of $Nb_2O_5$, $TiO_2$, $Ta_2O_5$, $Ti_2O_3$, $Ti_3O_5$ and $ZrO_2$.

The thickness of the first coating film and the third coating film may be less than the thickness of the second coating film and the fourth coating film.

The thickness of the first coating film may be the smallest among the first coating film, the third coating film and the hard coat film, and the thickness of the hard coat film may be the greatest among the first coating film, the third coating film and the hard coat film.

The thickness of the hard coat film may be at least 10 times the thickness of the multilayer film.

The thickness of the hard coat film may range from 1,000 to 3,000 nm.

The substrate may further include a fifth coating film disposed on the hard coat film, the fifth coating film being formed of a material, the refractive index of which is lower than the refractive index of the hard coat film.

The material of the fifth coating film may be identical to the material of the second coating film and the fourth coating film.

According to the present invention as set forth above, the multilayer structure, in which the higher refractivity coating films, the refractive index of which is identical to or higher than that of the hard coat film, and the lower refractivity coating film, the refractive index of which is lower than that of the hard coat film, are sequentially and repeatedly stacked on each other, is disposed under the hard coat film formed of AlON. It is possible to improve the durability of the substrate, while minimizing color shift when the substrate is applied to a display device.

In particular, according to the present invention, when the substrate for a display device is applied as a cover substrate of a touchscreen panel, the substrate can withstand millions of touches due to the superior durability thereof, while satisfying required superior optical characteristics due to minimized color shift.

DETAILED DESCRIPTION OF THE INVENTION

Figure 1:
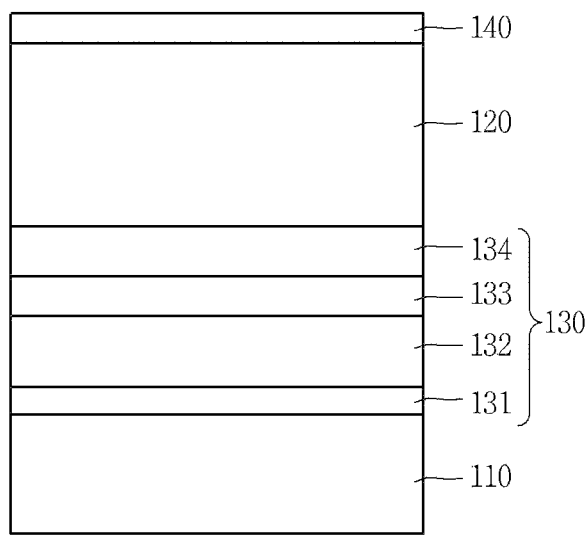
FIG. 1 is a schematic cross-sectional view illustrating a substrate for a display device according to an exemplary embodiment of the present invention.

Reference will now be made in detail to substrate for a display device according to the present invention, embodiments of which are illustrated in the accompanying drawings and described below, so that a person skilled in the art to which the present invention relates could easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted in the case that the subject matter of the present invention is rendered unclear.

As illustrated in FIG. 1, a substrate 100 for a display device (hereinafter referred to as a "display device substrate") according to an embodiment of the present invention is a substrate that is applicable for a cover substrate of a variety of display devices or a cover substrate of a touch-screen panel which is disposed on the front of a display device. The substrate display device 100 includes a base substrate 110, a hard coat film 120 and a multilayer film 130.

The base substrate 110 serves to support the hard coat film 120 and the multilayer film 130. The base substrate 110 may be formed of a material that is highly transparent and heat resistant, such that the base substrate 110 is applicable to a display device. In addition, regarding the transparency of the base substrate 110, the visible light transmittance thereof may be 80% or greater, and regarding the heat resistance of the base substrate 110, the glass transition temperature thereof may be 50° C. or higher. Furthermore, the base substrate 110 can be formed of a molding of an inorganic compound or an organic polymer. Examples of such a molding of an inorganic compound may include, but are not limited to, heat strengthened glass and quartz. Examples of such an organic polymer may include, but are not limited to, polyethylene terephthalate (PET), acryl, polycarbonate (PC), urethane acrylate (UA), polyester, epoxy acrylate, brominated acrylate and polyvinyl chloride (PVC).

The hard coat film 120 is disposed over the base substrate 110. More particularly, the hard coat film 120 is disposed on the multilayer film 130 which is formed on the base substrate 110. According to this exemplary embodiment, the hard coat film 160 is formed of AlON. Here, AlON is regarded as a rigid material having superior transmittance. However, AlON has been regarded as unsuitable for use as a cover substrate material of a display device, since it has significant variations in optical characteristics depending on a viewing angle, i.e. color shift occurring depending on the viewing angle. The exemplary embodiment overcomes the problem of color shift due to AlON by providing the multilayer film 130 underlying the hard coat film 120, the multilayer film 130 being formed by stacking a plurality of coating films having different refractive indices on each other, which will be described in more detail later.

Since the hard coat film 120 formed of AlON is the layer that enhances the surface strength of the display device substrate 100, the hard coat film 120 is formed as a thick film that is thicker than the multilayer film 130 composed of a plurality of coating films 131 to 134. The hard coat film 120 serves as a higher refractivity layer like the first and third coating film 131 and 133 of the multilayer film 130, since the refractive index of AlON of the hard coat film 120 ranges from 1.8 to 2.3. The hard coat film 120 may be formed thicker than the overall thickness of the first and third coating films 131 and 133. More particularly, the thickness of the hard coat film 120 may be at least 10 times the overall thickness of the multilayer film 130. According to an exemplary embodiment of the present invention, the thickness of the hard coat film may range from 1,000 to 3,000 nm and may be 2,000 nm.

The multilayer film 130 is disposed between the base substrate 110 and the hard coat film 120. In addition, multilayer film 130 is formed by sequentially and repeatedly stacking a coating film having a first refractive index and a coating film having a second refractive index on each other, the second refractive index being different from the first refractive index. The coating film having the first refractive index and the coating film having the second refractive index may be sequentially and repeatedly stacked on each other at least two times. According to an exemplary embodiment of the present invention, the coating film having the first refractive index forms a higher refractivity layer, the refractive index of which ranges from 2.0 to 2.5, whereas the coating film having the second refractive index forms a lower refractivity layer, the refractive index of which ranges from 1.35 to 1.6.

The multilayer film 130 includes the first coating film 131, the second coating film 132, the third coating film 133 and the fourth coating film 134. However, this is merely an example, and a greater number of coating films may be stacked.

The first coating film 131 is disposed on the base substrate 110. According to an exemplary embodiment of the present invention, the first coating film 131 forms a higher refractivity layer having the first refractive index. The first coating film 131 may be formed of a material, the refractive index of which is higher than that of the second coating film 132 and the fourth coating film 134. In addition, the first coating film 131 may be formed of the same material as the third coating film 133. Furthermore, the first coating film 131 may be formed of a material, the refractive index of which is identical to or higher than that of AlON of the hard coat film 120. When the first coating film 131 is formed of a high refractivity material in this manner, it is possible to reduce the thickness of the film, simplify the structure of the display device substrate 100, and satisfy a high level of optical characteristics due to a significant difference in a refractive index between the first coating film 131 and the second coating film 132 which forms a lower refractivity layer. According to this exemplary embodiment, the first coating film 131 which forms the higher refractivity layer may be formed of one metal oxide selected from among metal oxides having a refractive index ranging from 2.0 to 2.5, such as $Nb_2O_5$, $TiO_2$, $Ta_2O_5$, $Ti_2O_3$, $Ti_3O_5$ and $ZrO_2$.

The first coating film 131 may be the thinnest among the first coating film 131, the third coating film 133 and the hard coat film 120 each of which form a higher refractivity layer. According to an exemplary embodiment of the present invention, the thickness of the first coating film 131 may be 8 nm. However, this is merely an example, and the thickness of the first coating film 131 may vary depending on the thicknesses of the other higher refractivity layers.

The second coating film 132 is disposed on the first coating film 131. According to an exemplary embodiment of the present invention, the second coating film 132 forms a lower refractivity layer having the second refractivity index. The second coating film 132 may be formed of a material, the refractive index of which is lower than that of the first coating film 131 and the third coating film 133. Accordingly, the first and second coating films 131 and 132 form a multilayer structure of the higher and lower refractivity layers. The second coating film 132 may be formed of the same material as the fourth coating film 134.

According to an exemplary embodiment of the present invention, the second coating film 132 which forms the lower refractivity layer may be formed of a material, the refractivity of which ranges from 1.35 to 1.6, such as $SiO_2$ or $MgF_2$, since the first coating film 131 which forms the higher refractivity layer, the refractive index of which ranges from 2.0 to 2.5. However, according to the present invention, the material of the second coating film 132 is not limited to $SiO_2$ or $MgF_2$.

According to an exemplary embodiment of the present invention, the thickness of the second coating film 132 may be 48 nm. However, this is merely an example, and the thickness of the second coating film 132 may vary depending on the thicknesses of the other coating films.

The third coating film 133 is disposed on the second coating film 132. The third coating film 133 is formed of a material, the refractive index of which is higher than that of the second coating film 132, thereby forming a higher refractivity layer. The third coating film 133 may be formed of the same material having the first refractive index as the first coating film 131. For example, the third coating film 133 may be formed of one metal oxide selected from among metal oxides having a refractive index ranging from 2.0 to 2.5, such as $Nb_2O_5$, $TiO_2$, $Ta_2O_5$, $Ti_2O_3$, $Ti_3O_5$ and $ZrO_2$. Accordingly, the first coating film 131, the second coating film 132 and the third coating film 133 form a multilayer structure consisting of the higher refractivity layer, the lower refractivity layer and the higher refractivity layer.

According to an exemplary embodiment of the present invention, among the first coating film 131, the third coating film 133 and the hard coat film 120, each of which forms a higher refractivity layer, the third coating film 133 is formed to be thicker than the first coating film 131 and thinner than the hard coat film 120. According to this exemplary embodiment, since the first coating film 131 is 8 nm thick, the thickness of the third coating film 133 may be 18 nm, greater than the thickness of the first coating film 131.

The fourth coating film 134 is disposed on the third coating film 133. According to an exemplary embodiment of the present invention, the fourth coating film 134 is formed of the same material of the second coating film 132, thereby forming a lower refractivity layer having the second refractive index. The fourth coating layer 134 is formed of the material, the refractive index of which is lower than that of the first coating film 131 and the third coating film 133. According to this exemplary embodiment, since the second coating film 132 is formed of the material, the refractive index of which ranges from 1.35 to 1.6, such as $SiO_2$ or $MgF_2$, the fourth coating film 134 may also be formed of the same material. Accordingly, the first coating film 131, the second coating film 132, the third coating film 133 and the fourth coating film 134 form a multilayer structure including the higher and lower refractivity layers which are sequentially and repeatedly stacked on each other. The multilayer structure is composed of, for example, the higher refractivity layer, the lower refractivity layer, the higher refractivity layer and the lower refractivity layer. In this manner, the multilayer film 130 in which the multiple layers having different refractive indices are sequentially and repeated stacked on each other is disposed on the path of exiting light. In the multilayer film 130, the higher and lower refractivity layers are sequentially and repeated stacked on each other in the form of the higher, lower, higher and lower refractivity layers. This configuration can further improve the optical characteristics of the display device.

In addition, according to an exemplary embodiment of the present invention, the fourth coating film 134 may be formed to be 20 nm thick, less than the thickness of the second coating film 132, which is 48 nm.

The display device substrate 100 according to an exemplary embodiment of the present invention further includes a fifth coating film 140. The fifth coating film 140 is disposed on the hard coating film 120, and is formed of a material, the refractive index of which is lower than that of the hard coat film 120. The fifth coating film 140 may be formed of the same material as the second coating film 132 and the fourth coating film 134. The fifth coating film 140 may be formed of $SiO_2$ or $MgF_2$. According to this exemplary embodiment, the thickness of the fifth coating film 140 may be 13 nm. The fifth coating film 140 serves as a protection layer for the display device substrate 100.

In this manner, the display device substrate 100 according to an exemplary embodiment of the present invention includes the multilayer film 130, the hard coat film 120 and the fifth coating film 140, in which the multilayer film 130 consists of the first coating film 131, the second coating film 132, the third coating film 133 and the fourth coating film 134 which are sequentially and repeatedly stacked on the base substrate 110. Accordingly, display device substrate 100 has the multilayer structure of the higher/lower/higher/lower/higher/lower refractivity films which are disposed on the path of light exiting the display device. The display device substrate 100 can realize superior optical characteristics based on these differences in refractivity.

Herein, the first and third coating films 131 and 133, which form the higher refractivity layers together with the hard coat film 120, are not formed of AlON unlike the hard coat film 120. Rather, the first coating film 131 and the third coating film 133 are formed of, for example, $Nb_2O_5$, the refractive index of which is identical to or higher than that of AlON. This is because the higher the refractive index is, the less the thickness of the coating film may be. This can consequently simplify the structure of the multilayer film 130. In addition, when the difference in the refractive index between the material of the first and third coating films 131 and 133 and the material of the second and fourth coating films 132 and 134 which form the lower refractivity layers is greater than the difference in the refractive index between the material of the first and third coating films 131 and 133 and AlON, optical characteristics can be further improved. In addition, the first and third coating films 131 and 133 may be made of $Nb_2O_5$. This is because, if the AlON multiple layers are formed, processing is complicated, and thus facilities are complicated. In contrast, it is possible to form a stable $Nb_2O_5$ film through $O_2$ fine control. In addition, $Nb_2O_5$ has superior environment resistance like AlON. According to this exemplary embodiment, $Nb_2O_5$ or an equivalent metal oxide is selected for the first and third coating films 131 and 133 which form the higher refractivity layers, since the optical characteristics and durability of $Nb_2O_5$ are identical to or superior to those of AlON and it is easier to form $Nb_2O_5$ films than ALON films.

Figure 2:
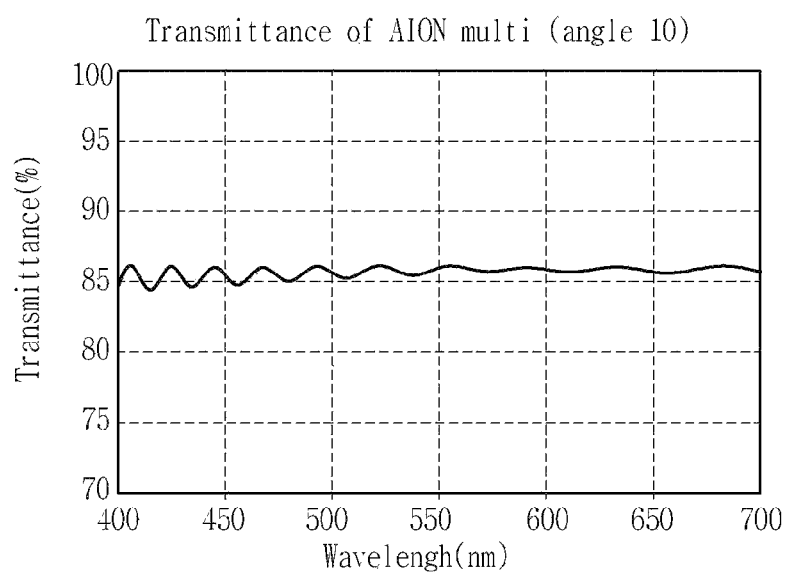
FIG. 2 and FIG. 3 are graphs illustrating levels of transmittance and reflectivity of a substrate for a display device according to an exemplary embodiment of the present invention that vary according to light wavelengths.
Figure 3:
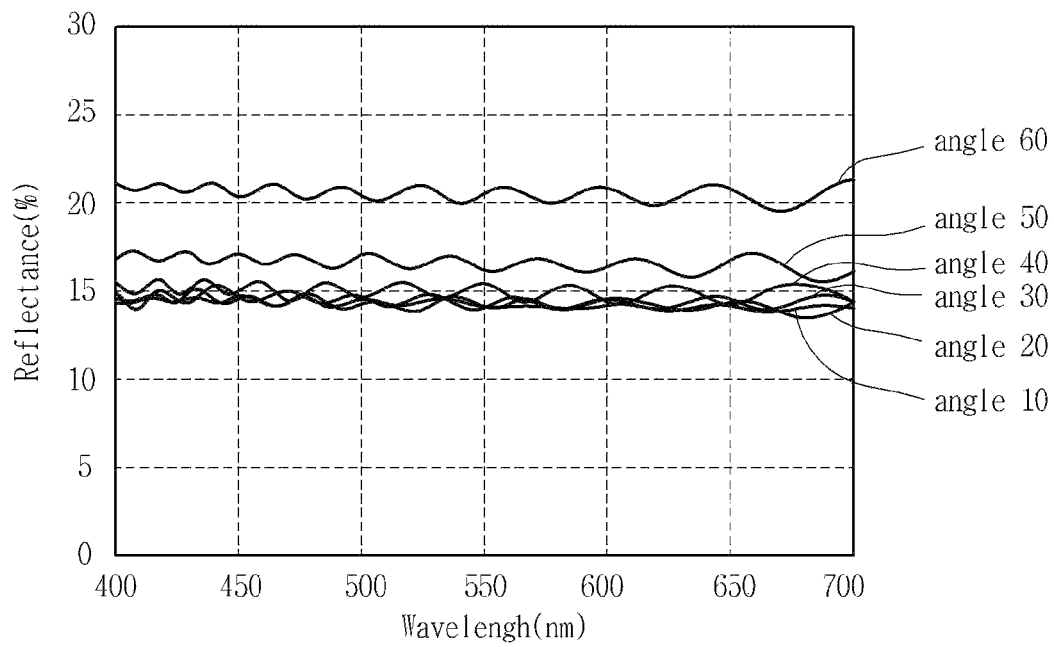

FIG. 2 and FIG. 3 are graphs illustrating the transmittance and reflectivity of the display device substrate according to an exemplary embodiment of the present invention that vary according to light wavelengths. As illustrated in the graphs of FIG. 2 and FIG. 3, it was appreciated that the display device substrate according to this exemplary embodiment had insignificant variations in the transmittance and the reflectivity according to light wavelengths at a variety of angles.

Figure 4:
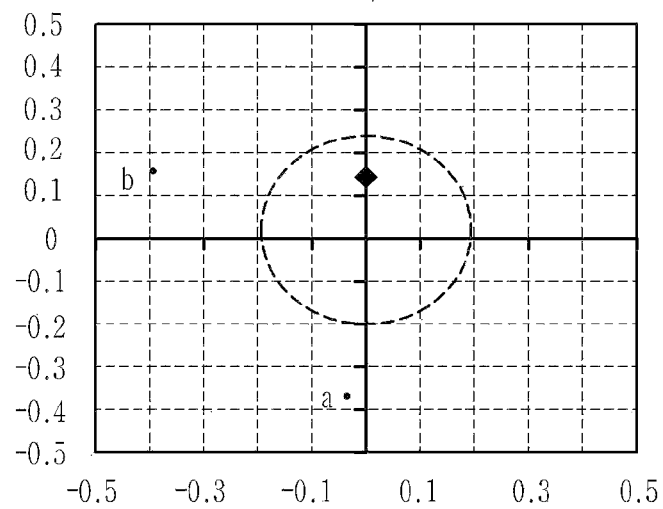
FIG. 4 to FIG. 6 are graphs of the results of a simulation illustrating the optical characteristics of a substrate for a display device according to an exemplary embodiment of the present invention.
Figure 5:
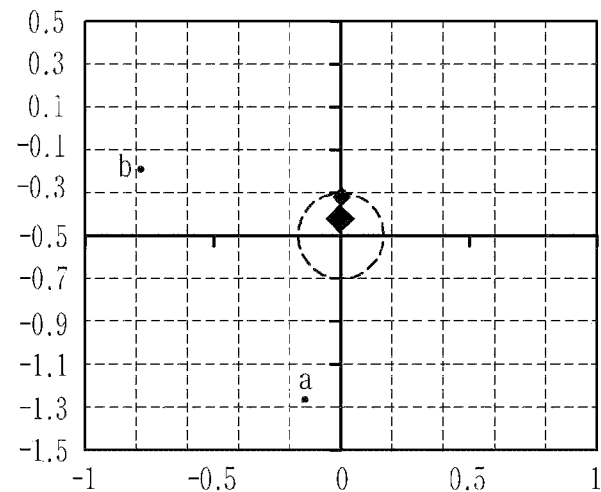
Figure 6:
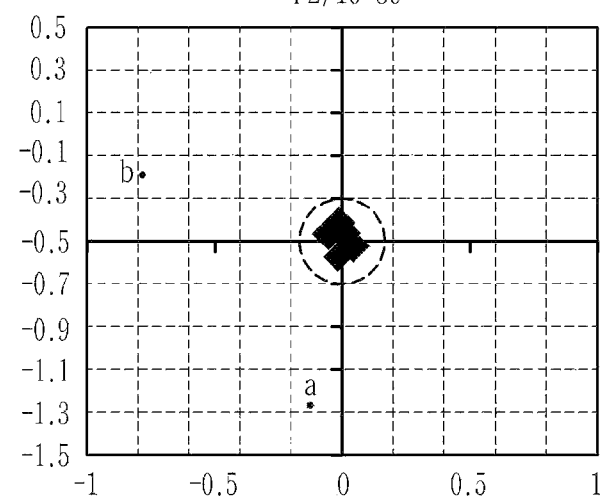

FIG. 4 to FIG. 6 are graphs of the results of a simulation illustrating the optical characteristics of a display device substrate according to an exemplary embodiment of the present invention. FIG. 4 to FIG. 6 illustrate the results of a simulation on colors a and b. Referring to the simulation results, it was appreciated that the transmittance and reflectivity of colors a and b are within allowable ranges.

As apparent from the above-described results, since the higher refractivity layers are formed of AlON and $Nb_2O_5$, the display device substrate according to this exemplary embodiment has superior durability and small variations in the transmittance and reflectivity at a variety of viewing angles. The display device substrate can consequently minimize color shift when applied to a display device. In particular, when the display device substrate according to this exemplary embodiment is applied as a cover substrate of a touchscreen panel, it can withstand millions of touches due to the superior durability thereof, while satisfying required superior optical characteristics due to minimized color shift.

According to an exemplary embodiment of the present invention, the six-layer structure formed by sequentially and repeatedly stacking the higher and lower refractivity layers on each other was illustrated. Although the number of layers of the multilayer structure is not limited, increasing the number of layers leads to a more complicated structure and a decrease in productivity, which are problematic. Above all, although the display device substrate may have an eight- or ten-layer structure, the optical characteristics of this display device substrate are equal or similar to those of the display device substrate having the six-layer structure. Therefore, there is no need to increase the number of layers of the display device substrate to be greater than six.

Accordingly, it is most preferable in terms of processing, cost, durability and optical characteristics that the display device substrate has the structure having the six coating layers.

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

DESCRIPTION OF REFERENCE NUMERALS

100: substrate for display device
110: base substrate
120: hard coat film
130: multilayer film
131: first coating film
132: second coating film
133: third coating film
134: fourth coating film
140: fifth coating film

What is claimed is:

1. A substrate for a display device, comprising:
a base substrate;
a hard coat film disposed over the base substrate, the hard coat film being formed of AlON; and
a multilayer film disposed between the base substrate and the hard coat film, wherein the multilayer film comprises at least one coating film having a first refractive index and at least one coating film having a second refractive index which are sequentially and repeatedly stacked on each other,
wherein the first refractive index ranges from 2.0 to 2.5, and the second refractive index ranges from 1.35 to 1.6,
wherein the multilayer film comprises:
a first coating film disposed on the base substrate, the first coating film having the first refractive index;
a second coating film disposed on the first coating film, the second coating film having the second refractive index;
a third coating film disposed on the second coating film, the third coating film having the first refractive index; and
a fourth coating film disposed on the third coating film, the fourth coating film having the second refractive index,
wherein each of the first coating film and the third coating film have a thickness less than each of the second coating film and the fourth coating film,
wherein a thickness of the hard coat film is at least 10 times a thickness of the multilayer film, and
wherein a thickness of the first coating film is smallest and a thickness of the hard coat film is greatest among the first coating film, the third coating film, and the hard coat film.

2. The substrate according to claim 1, wherein the at least one coating film having the first refractive index and the at least one coating film having the second refractive index are sequentially and repeatedly stacked on each other at least two times.

3. The substrate according to claim 1, wherein the first and third coating films are formed of a metal oxide, the refractive index of which ranges from 2.0 to 2.5, the metal oxide being selected from the group consisting of $Nb_2O_5$, $TiO_2$, $Ta_2O_5$, $Ti_2O_3$, $Ti_3O_5$ and $ZrO_2$.

4. The substrate according to claim 1, wherein the thickness of the hard coat film ranges from 1,000 to 3,000 nm.

5. The substrate according to claim 1, further comprising a fifth coating film disposed on the hard coat film, the fifth coating film being formed of a material, a refractive index of which is lower than a refractive index of the hard coat film.

6. The substrate according to claim 5, wherein the material of the fifth coating film is identical to a material of the second coating film and the fourth coating film.

* * * * *